US008681037B2

(12) United States Patent
Doria

(10) Patent No.: US 8,681,037 B2
(45) Date of Patent: Mar. 25, 2014

(54) PERFORMANCE MODEL FOR SYNTHETIC APERTURE RADAR AUTOMATIC TARGET RECOGNITION AND METHOD THEREOF

(75) Inventor: David M. Doria, Lakewood, CA (US)

(73) Assignee: Raytheon Company, Waltham, MA (US)

(*) Notice: Subject to any disclaimer, the term of this patent is extended or adjusted under 35 U.S.C. 154(b) by 509 days.

(21) Appl. No.: 13/096,913

(22) Filed: Apr. 28, 2011

(65) Prior Publication Data
US 2012/0274506 A1 Nov. 1, 2012

(51) Int. Cl.
*G01S 13/00* (2006.01)

(52) U.S. Cl.
USPC .......................... 342/25 R; 342/189; 342/190

(58) Field of Classification Search
USPC ........................................... 342/25, 189, 190
See application file for complete search history.

(56) References Cited

U.S. PATENT DOCUMENTS

| 5,963,653 A | 10/1999 | McNary et al. |
| 2003/0204382 A1* | 10/2003 | Julier et al. .................... 702/196 |
| 2010/0106676 A1 | 4/2010 | Doria |
| 2010/0271254 A1* | 10/2010 | Kanamoto et al. .............. 342/27 |

OTHER PUBLICATIONS

Boshra et al., Predicting an Upper Bound on SAR ATR Performance; Journal; Jul. 2001, pp. 876-888; vol. 37, No. 3; IEEE Transactions on Aerospace and Electronic Systems.
Brendel, et al., Benefits of Aspect Diversity for SAR ATR: Fundamental and Experimental Results; Journal; 2000; pp. 567-578; Proceedings of SPIE vol. 4053; Algorithms for Synthetic Aperture Radar Imagery VII.
Chiang et al., Performance Estimation of Model-Based Automatic Target Recognition using Attributed Scattering Center Features, Journal; 6 pages; Alphatec Inc., Burlington, MA.
Cho, Choongyeun; Performance Analysis for Synthetic Aperture Radar Target Classification; Manuscript; Feb. 2001; 65 pages; Massachusetts Institute of Technology.
Devore et al., Quantitative Statistical Assessment of Conditional Models for Synthetic Aperture Radar; Journal; Feb. 2004; pp. 113-125; vol. 13, No. 2; IEEE Transactions on Image Processing.
O'Sullivan et al., SAR ATR Performance Using a Conditionally Gaussian Model; Journal; Jan. 2001; pp. 91-108; vol. 37, No. 1, IEEE Transactions on Aerospace and Electronic Systems.
Dixon et al., Information-theoretic bounds on target recognition performance from laser radar data; Journal; 2006; 10 pages, Proceedings of SPIE vol. 6234; Automatic Target Recognition XVI.

(Continued)

*Primary Examiner* — Timothy A Brainard
(74) *Attorney, Agent, or Firm* — Christie, Parker & Hale, LLP

(57) ABSTRACT

A target correlation matrix is generated for multiple two-class combinations of target types each having a target correlation and a synthetic aperture radar observation space. A target probability density of a target radar cross-section signature and a background probability density of a background radar cross-section signature are utilized. The observation space of each of the two-class combinations is partitioned into a target partition and at least one background partition in accordance with the target correlation. A conditional log likelihood is calculated using at least one random number for each of the partitions in accordance with the target probability density and the background probability density, and summed according to the two-class combinations. A maximum log likelihood is calculated from the summed conditional log likelihoods given that one target type of the multiple two-class combinations is assumed to be true. An automatic target recognition performance prediction based on the maximum log likelihood is generated.

18 Claims, 4 Drawing Sheets

(56) References Cited

OTHER PUBLICATIONS

Doria et al., SAR Feature Representation and Matching Using the Probabilistic Distance Transform; Journal; 2000, Proceedings of SPIE vol. 4053; Algorithms for Synthetic Aperture Radar Imagery VII.

Doria, David M., Feature Distributions and Probability of Identification; Journal; Apr. 1999; pp. 809-818; SPIE vol. 3721; Part of the SPIE Conference on Algorithms for Synthetic Aperture Radar Imagery VI, Orlando, Florida.

Edwards, Dave; Monte Carlo Integration; Notes; 15 pages.

Gao, Gui; Statistical Modeling of SAR Images: A Survey; Journal; Jan. 21, 2010; pp. 775-795; Sensors.

Horowitz et al., Fundamental SAR ATR Performance Predictions for Design Tradeoffs: 1-D HRR versus 2-D SAR versus 3-D SAR; Journal; Apr. 1999; pp. 763-784; SPIE vol. 3721; Part of the SPIE Conference on Algorithms for Synthetic Aperture Radar Imagery VI, Orlando, Florida.

Horowitz et al., Fundamental SAR ATR Performance Predictions for Design Tradeoffs; Journal; pp. 267-284; SPIE vol. 3070.

Lavely et al., Model-based and data-based approaches for ATR performance prediction; Journal; 2003; pp. 358-369; Proceedings of SPIE vol. 5095; Algorithms for Synthetic Aperture Radar Imagery X.

Moser et al., Finite mixture models and stochastic Expectation-Maximization for SAR amplitude probability density function estimation based on a dictionary of parametric families; Journal; 2004; pp. 1510-1513; IEEE.

Yeang et al., Toward target recognition from synthetic aperture radar imagery using electromagnetics-based signatures; Journal; Jul. 2003; pp. 2129-2149; vol. 42, No. 7; Optical Engineering.

Yousefi et al., Modelling SAR Clutter in Multi-Resolution Radar Systems; Journal; 2006; 8 pages; Proceedings of SPIE vol. 6343; Photonics North 2006.

\* cited by examiner

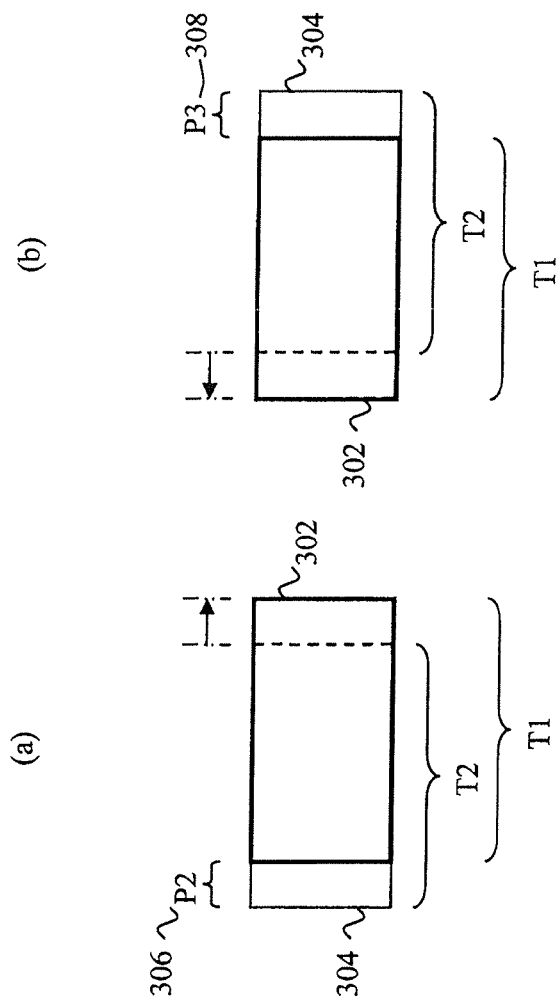

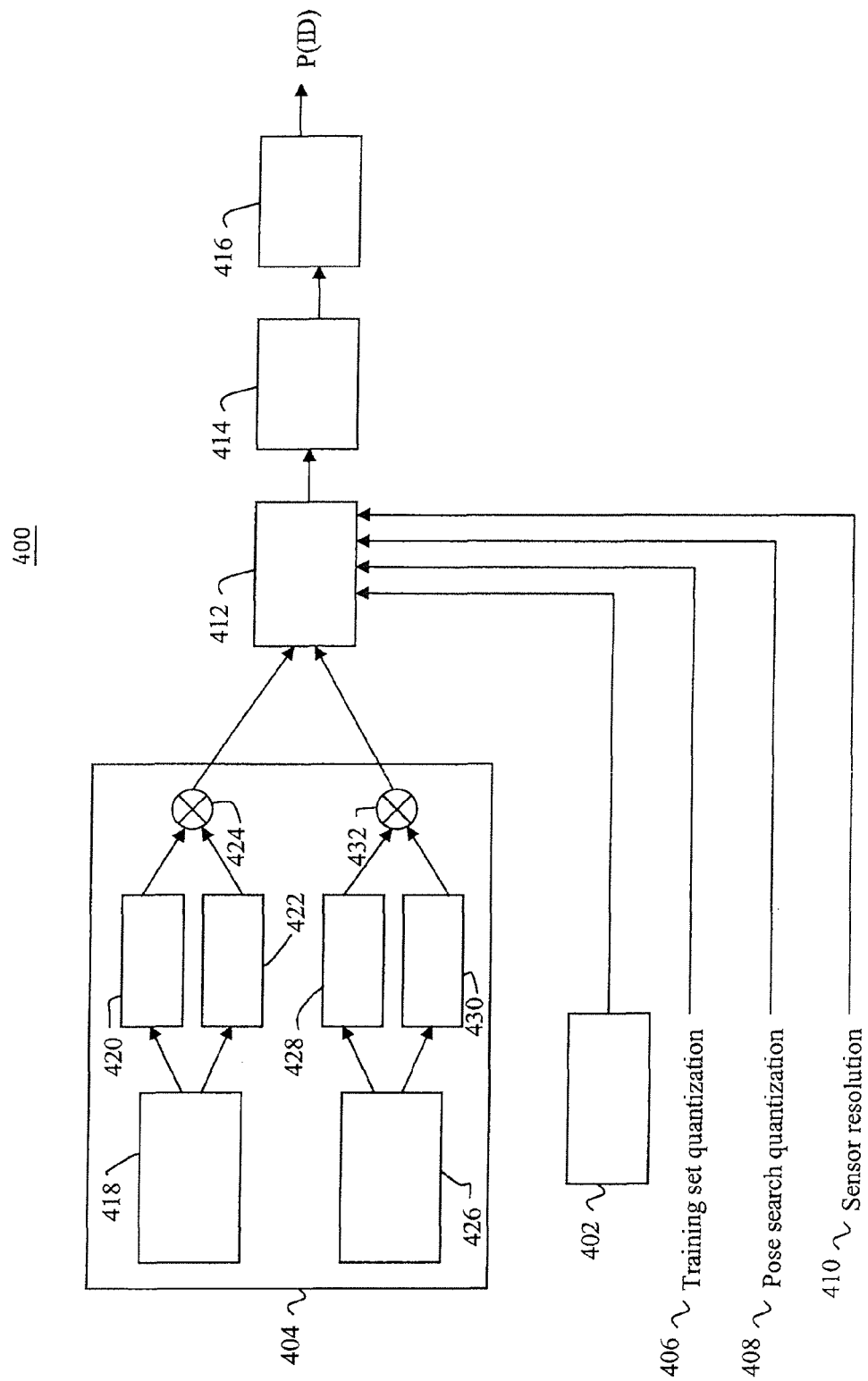

PERFORMANCE MODEL FOR SYNTHETIC APERTURE RADAR AUTOMATIC TARGET RECOGNITION AND METHOD THEREOF

BACKGROUND

1. Technical Field

The present invention relates to a performance model for synthetic aperture radar (SAR) automatic target recognition (ATR) and method thereof.

2. Brief Description of Related Art

With the advent of highly sophisticated ATR systems for SAR systems, predictability of performance at an engineering level has become increasingly important.

Such performance predictions generally take into account a variety of operating conditions, target types, sensor design parameters and other known parameters. Currently, modeling SAR ATR performance generally requires empirical regression-based testing. Such models take into account the Radar Cross-Section (RCS) of the types of targets to make predictions, but require running an ATR system over the operating conditions under study.

These models also generally require multiple templates of actual SAR data or models of SAR data to predict performance over the operating conditions under study, which may complicate and/or make the predictive data less accessible.

SUMMARY OF THE INVENTION

Exemplary embodiments according to the present invention provide a performance model for SAR ATR that provides engineering-level performance predictions over a variety of operating conditions, target types, sensor design parameters and other known parameters. The performance model provides ATR predictions of target type using a high-level knowledge of the SAR system, using mixture densities within correlation-based generalized sets that are used in calculation of Monte-Carlo integration.

According to an exemplary embodiment in accordance with the present invention, there is provided a method of predicting synthetic aperture radar automatic target recognition performance. A target correlation matrix for two or more classes is generated for combinations of target types. Each element of the correlation matrix is for a specific two-target class combination, each having a between-target correction, the set of which two-class correlations comprise the full correlation matrix. A target probability density of a target radar cross-section signature and a background probability density of a background radar cross-section signature are generated. The observation space of each of the two-class combinations is partitioned into a target partition and at least one background partition in accordance with the target correlation. The probability densities associated with both the target and background partitions for each of the multiple two-class combinations in the correlation matrix are generated. This allows calculation of multiple simulated observations of a hypothetical observation space associated with each possible target correlation combination from the correlation matrix. A property of this observation space is that because the probability densities of actual SAR measurements are used for the background and target partitions, the information associated with actual SAR measurements followed by automatic target recognition processing is approximated by the simulated observation space. A conditional log likelihood is calculated using at least one random number for each of the partitions in accordance with the target probability density and the background probability density, and summed according to the two-class combinations. A maximum log likelihood is calculated from the summed conditional log likelihoods given that one target type of the multiple two-class combinations is assumed to be true. An automatic target recognition performance prediction based on the maximum log likelihood is generated.

The method may further include assigning the target probability density to the target partition and the background probability density to the at least one background partition.

The target correlation matrix may be based on a geometric similarity between a first target type of one of the two-class combinations of target types and a second target type of the one of the two-class combinations of target types. Other similarity information such as prior radar measurements or measurements from other (including visible) sensors may be used to generate or to contribute to the correlation values.

The observation space may be partitioned by projecting a geometric representation of a first target type of one of the two-class combinations of target types over a geometric representation of a second target type of the one of the two-class combinations of target types, shifting the first target type in a first direction in accordance with the target correlation and shifting the first target type in a second direction opposite the first direction in accordance with the target correlation.

The target partition may include an overlapping portion between the first target type and the second target type, a first background partition may include a first non-overlapping portion between the first target type and the second target type after the first target type is shifted in the first direction, and a second background partition may include a second non-overlapping portion between the first target type and the second target type after the first target type is shifted in the second direction. These are generalized geometric measures of target overlap and non-overlapping areas. The meaning of generalized is that the precise locations of overlapping pixels are not important; what is used by the system is the number of overlapping and non-overlapping pixels, which correspond to actual numbers of overlapping and non-overlapping SAR pixels, leading to generation of the partitions, which are also generalized in the same sense.

The target probability density may be generated from diffuse and specular components of the target radar cross-section signature.

The diffuse and specular partition components each are modeled using probability densities that are associated with actual SAR data measurements. The diffuse component and the specular component may both include Rayleigh probability densities with different actual values of the Rayleigh density parameter. Alternatively, the diffuse component may include Rayleigh parameters and the specular component may include Rician parameters. Alternatively, the diffuse and specular components may both include gamma density parameters of different values. Other probability densities are in principle able to be incorporated that could potentially make the Monte Carlo simulation more accurate for certain SAR systems and data types (for example K distributions for clutter and Wishart distributions for target and clutter).

The background probability density may be generated from clutter and shadow components of the background radar cross-section signature.

The clutter and shadow components may include Rayleigh parameters or gamma density parameters.

According to another exemplary embodiment in accordance with the present invention, there is provided a performance model for synthetic aperture radar automatic target recognition. The performance model may include a target correlation matrix generator configured to generate a target correlation matrix for multiple two-class combinations of target types each having a target correlation and a synthetic aperture radar observation space, a probability density generator for generating a target probability density of a target radar cross-section signature and a background probability density of a background radar cross-section signature, a partition generator for partitioning the observation space of each of the two-class combinations of target types into a target partition and at least one background partition in accordance with the target correlation, a random number generator for generating at least one random number for each of the partitions in accordance with the target probability density and the background probability density, wherein the target partition is associated with the target probability density and the at least one background partition is associated with the background probability density, an automatic target recognition calculator for calculating a conditional log likelihood using the at least one random number for each of the partitions in accordance with the target probability density and the background probability density, summing the conditional log likelihoods of the partitions according to the two-class combinations of target types, calculating a maximum log likelihood from the summed conditional log likelihoods given that one target type of the two-class combinations of target types is assumed to be true, and generating an automatic target recognition performance prediction based on the maximum log likelihood.

The target probability density may be assigned to the target partition and the background probability density may be assigned to the at least one background partition.

The target correlation may be based on a geometric similarity between a first target type of the two-class combinations of target types and a second target type of the two-class combinations of target types.

The observation space may be partitioned by projecting a geometric representation of a first target type of one of the two-class combinations of target types over a geometric representation of a second target type of the one of the two-class combinations of target types, shifting the first target type in a first direction in accordance with the target correlation and shifting the first target type in a second direction opposite the first direction in accordance with the target correlation.

The target partition may include an overlapping portion between the first target type and the second target type after the first target type is shifted in the first direction and shifted in the second direction, a first background partition may include a first non-overlapping portion between the first target type and the second target type after the first target type is shifted in the first direction, and a second background partition may include a second non-overlapping portion between the first target type and the second target type after the first target type is shifted in the second direction.

The probability density generator may include a diffusion component generator for generating a diffuse component of the target probability density and a specular component generator for generating a specular component of the target probability density.

The diffusion component may include Rayleigh parameters and the specular component may include Rician parameters.

The probability density generator may include a target mixture density generator for combining the diffuse component and the specular component.

The probability density generator may include a clutter component generator for generating a clutter component of the second probability density and a shadow component generator for generating a shadow component of the second probability density.

The clutter and shadow components may include Rayleigh parameters.

The probability density generator may include a background mixture density generator for combining the clutter and shadow components.

The target partition and the at least one background partition for each of the two-class combinations of target types may be compiled into a set.

The at least one random number may be generated by Monte-Carlo simulation for each of the members of the set.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein:

FIG. 3 is a diagram illustrating the partitioning of observation space for a two-class combination of target types based on target correlation in accordance with an embodiment of the present invention; and FIG. 4 is a block diagram illustrating a performance model for synthetic aperture radar automatic target recognition in accordance with an embodiment of the present invention.

DETAILED DESCRIPTION

Figure 1:
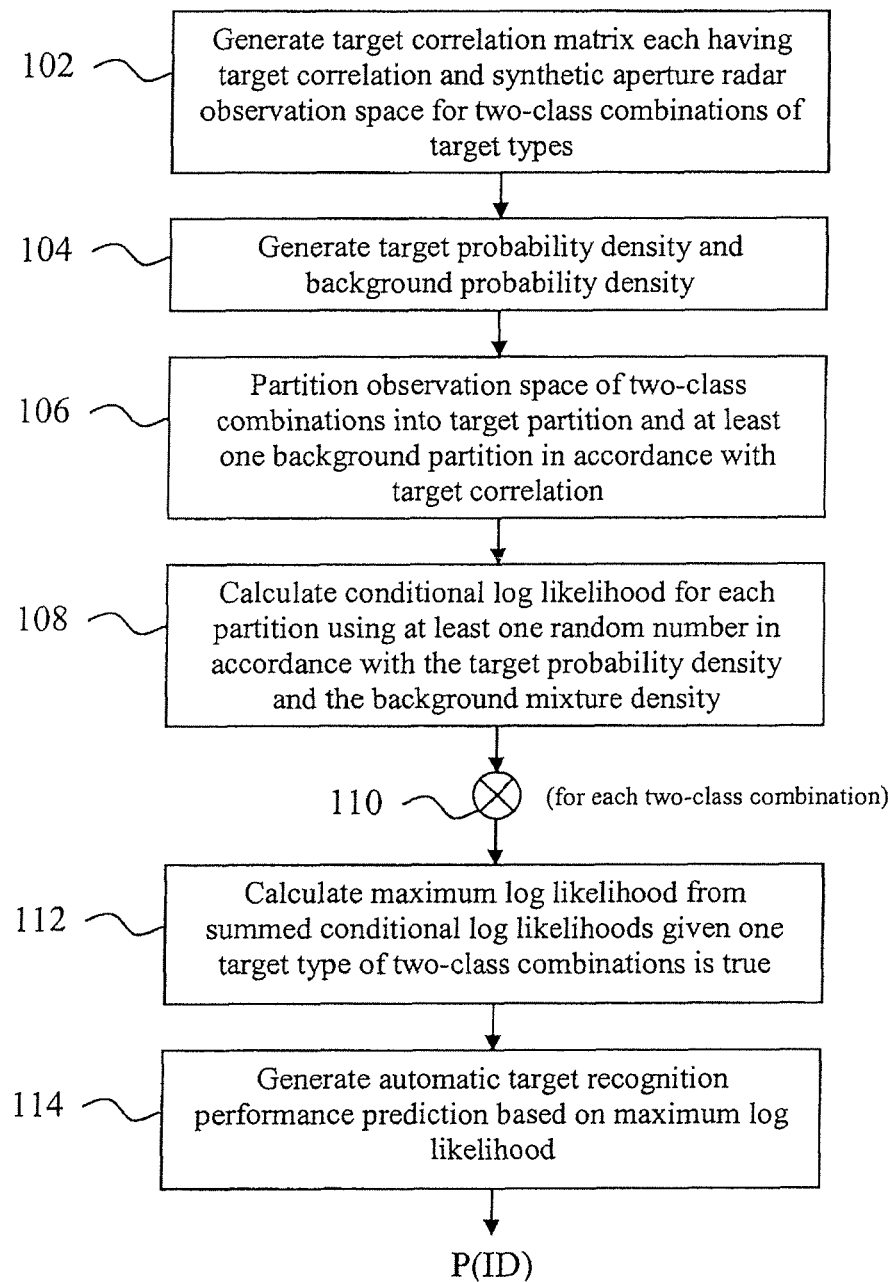
FIG. 1 is a flow diagram illustrating a method of predicting synthetic aperture radar automatic target recognition performance in accordance with an embodiment of the present invention.

The present invention will now be described more fully with reference to the accompanying drawings, in which exemplary embodiments thereof are shown. The invention may, however, be embodied in many different forms and should not be construed as being limited to the embodiments set forth herein. Rather, these embodiments are provided so that this disclosure is thorough and complete, and will fully convey the concept of the present invention to those skilled in the art.

Accordingly, there is presented a performance model for SAR ATR that provides engineering-level performance predictions over a variety of operating conditions, target types, sensor design parameters and other known parameters. The performance model provides ATR predictions of target type using a high-level knowledge of the SAR system, using mixture densities within correlation-based generalized sets and for Monte-Carlo integration.

The performance model assumes that a variety of known parameters affect SAR ATR performance, and provides a tremendous benefit to the ATR user and designer, such that it is not necessary to actually perform the SAR ATRs to measure theoretical maximum performance.

In general terms, a system and method for predicting ATR performance includes modeling the essential information that allows discrimination of targets from one another in SAR imagery, while not actually requiring measurements of this information at a detailed (i.e. pixel specific) level in order to run the prediction model for a specific set of target types. An embodiment of the present invention adopts a likelihood based method that generalizes the information in actual target signatures according to a theoretic set of components, using a set based decomposition of the possible events in a set of repeated random experiments. The observation event space may therefore be decomposed into sub-parts, corresponding to a partition of the probabilistic event space.

Simulation of densities within the subsets corresponds to the observations that characterize the different likelihoods, or log likelihoods, of hypothesized target types. All target type pairs are considered and log likelihoods generated by use of a correlation matrix that directs the mapping of the event space into subsets conditioned on each target type pair. Monte Carlo draws for each set of pixels or resolution elements within each subset are run numerous times, each of which is a random experiment with conditional densities of each target region and class. This enables the model to be amenable to a Monte-Carlo method of integration over the set-based event space.

An embodiment of the present invention uses a mixture model of target and background densities (Rayleigh and Ricean for the target and Rayleigh for the background). This requires low level estimates of the parameters of these models from either data or inferred prior knowledge about a particular imaging set of conditions. However, precise measurements that depend on the specifics of the target "shape" are not necessary.

FIG. 1 is a flow diagram illustrating a method for predicting synthetic aperture radar automatic target recognition performance in accordance with an embodiment of the present invention.

Referring now to FIG. 1, at block 102, a target correlation matrix is generated. The target correlation matrix is generated for a number of two-class combinations of target types each having a target correlation and a synthetic aperture radar observation space. In an embodiment, the target correlation is calculated based on a geometric similarity between the first target type of one of the two-class combinations of target types and a second target type of the one of the two-class combinations of target types. For example, the target correlation is expressed as a percentage geometric similarity (e.g., 90% similarity). One of ordinary skill in the art would understand that geometric similarity is only a single possibility, and other characteristics of the targets may function as the target correlation depending on the system configuration.

At block 104, a target probability density of a target relative radar cross-section signature (RCS) and a background probability density of a background relative RCS are utilized. In an embodiment, the target relative RCS and the background relative RCS are generated from a generic SAR image, although other more specific SAR images may be used including the actual SAR image that an actual ATR may be run on. In an embodiment, the target probability density is applied to simulate diffuse and specular components of the target relative RCS. For example, the diffuse component includes Rayleigh parameters and the specular component includes Rician parameters. The Rayleigh and Rician parameters will be discussed in greater detail below. In an embodiment, the background probability density is applied to simulate clutter and shadow components of the background relative RCS. For example, both the clutter and shadow components include Rayleigh parameters. One of ordinary skill in the art would understand that the Rayleigh and Rician parameters associated with the specified components are an aspect of the present embodiment, and other configurations exist depending on the system configuration. For example, Understanding Synthetic Aperture Radar Images, by C. Oliver and S. Quegan, 1998 Artech House, Inc., Chapter 4, hereby incorporated by reference in its entirety, discusses a Rayleigh model for SAR data. In addition, ATR Performance of a Rician Model for SAR Images, by M. D. Devore, A. D. Lanterman and J. A. O'Sullivan, Proceedings of Society of PhotoOptical Engineers, Vol. 4050, Automatic Target Recognition X, pp. 34-45, hereby incorporated by reference in its entirety, discusses a Rician model for SAR data.

At block 106, the observation space of each of the two-class combinations of target types is partitioned into a target partition and at least one background partition. The partitions are generated in accordance with the target correlation. In other words, the SAR observation space is generalized which makes it applicable to all possible targets of a specified correlation. It is therefore capable of estimating performance for any set of target types simply by using their correlation matrix. For example, the observation space is partitioned into three partitions: one target partition and two background partitions (e.g., a first background partition and a second background partition). In an embodiment, the observation space is the union of the target partition and the first and second background partitions. Note at this point the performance model is using generalized sets to represent correlations of different target type combinations. The generalized sets are represented geometrically as rectangles. Those familiar with Venn diagrams in probability theory will recognize this concept and method of illustration of probabilistic ideas. A method of shifts is used corresponding to the required shift such that the overlap of the generalized Venn-type rectangles for different targets achieves the same correlation as that of the actual targets given in a particular element of the correlation matrix. The target partition may be defined to be the overlapping portion of a geometric representation of the first target type and a geometric representation of the second target type after shifting by Tc in one direction, where Tc is that shift such that the resulting geometric correlation of the Venn rectangles is equivalent to the actual value of the correlation matrix for a given target pair. The first background partition may be defined to be the non-overlapping portion between the first target type and the second target type after shifting the first target type in a direction equal to TC and is the part of the first target that overlaps the background after this shift. The second background partition may be defined to be the non-overlapping portion of the second target (between the first target type and the second target type) after shifting the first target type by Tc and is the part of the second target that overlaps the background after this shift. If the target correlation is 90%, therefore, the total observation space would be calculated to be 110% of the size of the original target types, assuming the target types are equal in size. The total observation space generalized area is 110% of the target area in this example (90% overlap+10% background partition 1+10% background partition 2) due to non-overlapping background components of the first and second targets both being included in the observation space in addition to the overlapping target component. This is understood as that the performance model must consider both the generalized areas where targets overlap each other, and the generalized areas where each different target overlaps background, which are in different areas, leading to a total generalized area that is larger than either of the separate targets. One of ordinary skill in the art would understand that the observation space may also be calculated where the target types are unequal sizes. This would be accomplished by shifting the Venn rectances such that the equation $R_{1,2}$=(Intersection of Area of target Venn Rectangle 1 with Area of target Venn rectangle 2) divided by (union of Area of target Venn Rectangle 1 with Area of target Venn Rectangle 2), where $R_{1,2}$ is the correlation matrix element value for targets 1 and 2 (note that targets i and i from the correlation matrix is the general expression). This is expressed mathematically as either $$R_{1,2} = \frac{\text{Area}_1 \cap \text{Area}_2}{\text{Area}_1 \cup \text{Area}_2} \text{ or } R_{1,2} = \frac{\text{Area}_1 \cap \text{Area}_2}{\max(\text{Area}_1, \text{Area}_2)}.$$

The partitioning of the observation space may further be described in terms of resolution elements. For example, a resolution element is derived from the effective sensor resolution of the SAR system. To determine the number of resolution elements of the observation space, the union of the target partition and the first and second background partitions is divided by the effective SAR sensor resolution (e.g., the quotient). The partitioning of the observation space is discussed in greater detail with respect to FIGS. 2 and 3.

Further with respect to block 106, the partitions may be compiled into a set and assigned target probability density and background probability density functions with target and background probability density components (e.g., diffuse, specular, clutter and shadow components of target and background relative RCS). The target and background probability density functions with Rayleigh and Rician components, for example, may be used to calculate the conditional log likelihood using Monte-Carlo integration, as discussed below with respect to blocks 108-112.

At block 108, a conditional log likelihood is calculated for each of the partitions using at least one random number in accordance with the target probability density and the background probability density. It is generally too difficult to integrate analytically over all partitions to obtain a result. In an embodiment, therefore, the at least random number is generated using a Monte-Carlo simulation. For example, the Monte-Carlo simulation generates a random number for each resolution element of the observation space. In an embodiment, the target probability density includes both a Rayleigh diffusion component and a Rician specular component, and the background probability density includes Rayleigh clutter and shadow components.

At summation symbol 110, the conditional log likelihood for all of the partitions is summed according to the two-class combinations of target types. For example, the result is a sum of the respective two-class combinations of target types over all partitions, which gives the conditional log likelihood of each of the two-class combinations of target types.

At block 112, a maximum log likelihood is calculated from the summed conditional log likelihoods, given that one target type of the two-class combinations of target types is assumed to be true. For example, in other words, the sum of the respective two-class combinations of target type conditional log likelihoods over all partitions gives a conditional log likelihood of each two-class combination of target types which may be tested for "correct" or "incorrect" for the maximum log likelihood, allowing estimation of the overall P(ID) using Monte-Carlo simulations.

In greater detail, blocks 108-112 may be mathematically defined as follows. The expression for the Rayleigh probability density for an observation x with parameter σ is:

$$P(x \mid \text{Rayleigh}, \sigma) = \frac{x}{\sigma^2} e^{-\frac{x^2}{2\sigma^2}}.$$

The expression for the Rician probability density for an observation x with parameters σ and A is:

$$P_{Rician}(x \mid \sigma, A) = \frac{x}{\sigma^2} e^{-\frac{(x^2+A)}{2\sigma^2}} I_0\left(\frac{Ax}{\sigma^2}\right),$$

where $I_0(z)$ is the modified Bessel function of the first kind of order 0.

For a set of $N_{Ray}$ discrete Rayleigh random variables with parameter σ, the joint likelihood, assuming independence of each observation, is:

$$P_{Rayleigh}(x_1, x_2, \ldots x_{N_{Ray}} \mid \sigma) = \frac{x_1 x_x \ldots x_{N_{Ray}}}{\sigma^{2N_{Ray}}} e^{-\frac{\sum_{n=1}^{N_{Ray}} x_n^2}{2\sigma^2}}.$$

The log likelihood (using the natural logarithm) of the joint set of observations then follows as:

$$L_{Rayleigh}(x_1, x_2, \ldots x_{N_{Ray}} \mid \sigma) = \sum_{n=1}^{N_{Ray}} \ln(x_n) - 2N_{Ray}\ln\sigma - \frac{1}{2\sigma^2}\sum_{n=1}^{N_{Ray}} x_n^2$$

An approximate expression for the Bessel function term is:

$$\ln(I_0(z)) \approx z - 0.5 \ln(2\pi) - 0.5 \ln(z).$$

Substituting this into the log likelihood expression for the Rician joint density gives:

$$L_{Rician}(x_1, x_2, \ldots x_{N_{Ray}} \mid \sigma, A) \approx$$

$$\sum_{n=1}^{N_{Ray}} \ln(x_n) - 2N_{Rice}\ln\sigma - \frac{N_{Rician}A^2}{2\sigma^2} - \frac{1}{2\sigma^2}\sum_{n=1}^{N_{Ray}} x_n^2 + \sum_{n=1}^{N_{Ray}} \frac{Ax_n}{\sigma^2} -$$

$$.919 N_{Rician} - 0.5 N_{Rician} \ln\left(\frac{A}{\sigma^2}\right) - 0.5 \sum_{n=1}^{N_{Rician}} \ln(x_n) =$$

$$0.5 \sum_{n=1}^{N_{Ray}} \ln(x_n) - 2N_{Rician}\ln\sigma - N_{Rician}\left(\frac{A^2}{2\sigma^2} + .919\right) -$$

$$\frac{1}{2\sigma^2}\sum_{n=1}^{N_{Ray}} x_n^2 + \sum_{n=1}^{N_{Ray}} \frac{Ax_n}{\sigma^2} - .919 N_{Rician} - 0.5 N_{Rician} \ln\left(\frac{A}{\sigma^2}\right).$$

At block 114, an ATR performance prediction is generated based on the maximum log likelihood. For example, the ATR performance prediction is P(ID), which is expressed as the ratio of the number of target types identified correctly and the number of target types detected (e.g., P(ID)=$N_{ID}/N_{DET}$). Using the results of the maximum log likelihood, P(ID) takes into account the average over all targets. The P(ID) ratio provides a result that may allow one of ordinary skill in the art how often a given SAR ATR will work (e.g., 85% of the time). The result attempts to predict the theoretical maximum performance of the particular SAR ATR.

Figure 2:
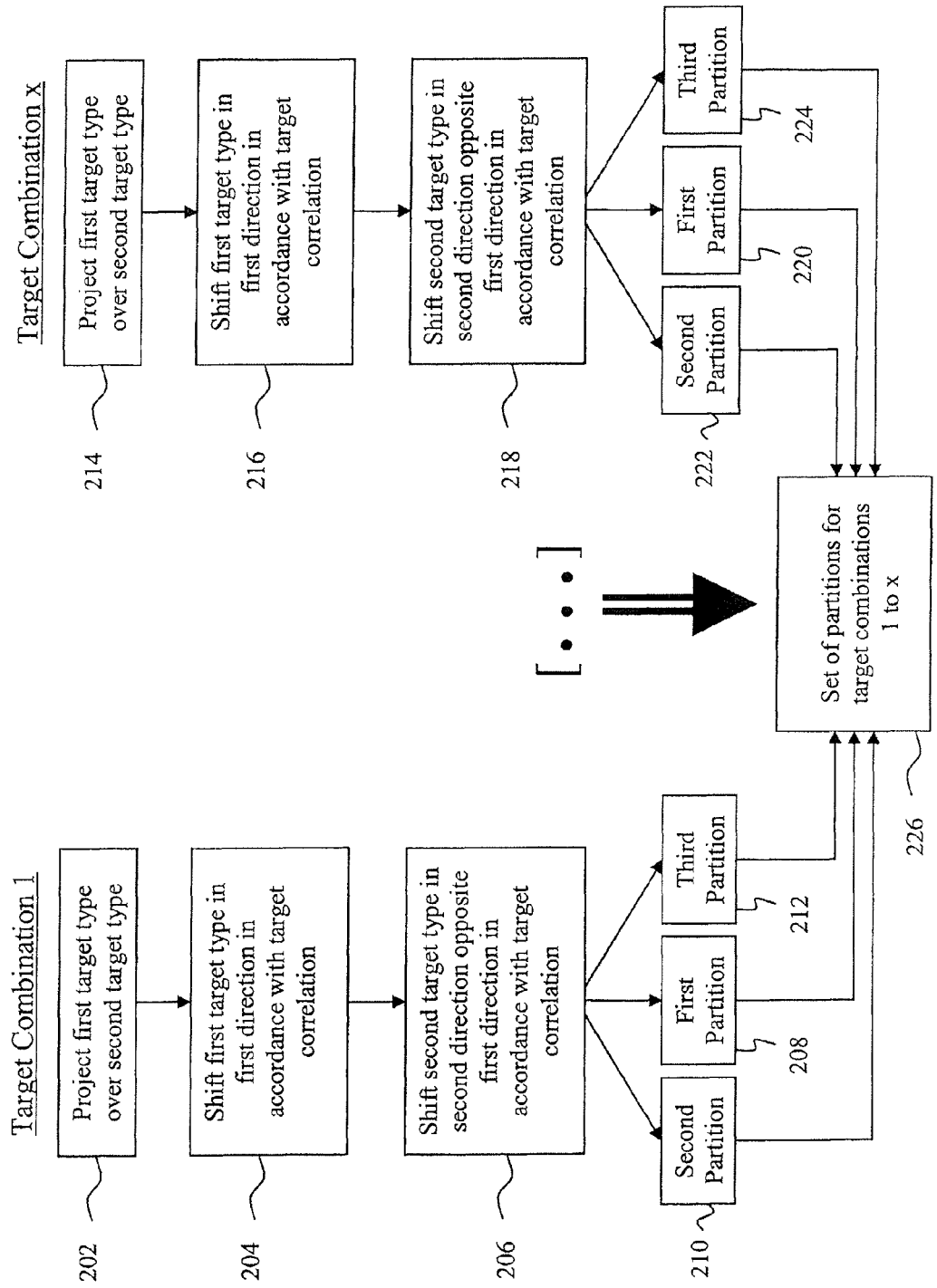
FIG. 2 is a flow diagram illustrating the partitioning of observation space for two-class combinations of target types based on target correlation in accordance with an embodiment of the present invention.

FIG. 2 is a flow diagram illustrating the partitioning of observation space for two-class combinations of target types based on target correlation in accordance with an embodiment of the present invention.

Referring to FIG. 2, at block 202, a geometric representation of a first target type of one of the two-class combinations of target types (e.g., "Target Combination 1") is projected over a geometric representation of a second target type of the one of the two-class combinations of target types (e.g., "Target Combination 1"). For example, a geometric representation of a "blue force" armored vehicle is projected over a geometric representation of a "red force" armored vehicle.

At block 204, the first target type is shifted in a first direction in accordance with the target correlation (e.g., target correlation between the first and second target types). Note at this point the performance model is using generalized sets to represent correlations of different target type combinations. The generalized sets are represented geometrically as rectangles in the figure. Those familiar with Venn diagrams in probability theory will recognize this concept and method of illustration of probabilistic ideas. The shifts correspond to the required shift such that the overlap of the generalized Venn-type rectangles for different targets achieves the same correlation as that of the actual targets given in a particular element of the correlation matrix. If the Ts (Target Size) is 100 units and the correlation between the first and second targets is 85%, the first target type is shifted by 15 units to the left. One of ordinary skill in the art would understand that other target correlations and first and second target type sizes will determine the amount to shift the first target type.

At block 206, project target type 1 and target type 2 onto a common plane after the shift by Tc.

At blocks 208, 210 and 212, the first, second and third partitions are outputted to block 226. The first partition is defined as the overlapping portion between the first target type and the second target type. For example, the first partition is equivalent to the target correlation, since it is based on geometric similarity or overlap or equivalent Venn diagram intersection between the first and second target types. Accordingly, if the target correlation is 85% and the Ts (Target Size) is 100 units, the first partition is 100×85%=85 units. For example, if the SAR resolution is known, the 100 units may be converted into resolution elements.

At block 214, a geometric representation of a first target type of one of the two-class combinations of target types (e.g., "Target Combination x") is projected over a geometric representation of a second target type of the one of the two-class combinations of target types (e.g., "Target Combination x"). For example, a geometric representation of a "blue force" armored vehicle is projected over a geometric representation of a "red force" armored vehicle.

At block 216, the first target type is shifted in a first direction in accordance with the target correlation (e.g., target correlation between the first and second target types). For example, if the target correlation between the first and second target types is 85%, the first target type is shifted left by an amount such that the overlap between the first and second target types is 0.85. This can be done by representing the targets as rectangles of arbitrary dimensions; what is important is the resultant overlap. If for example the Ts Target Sizes are 100 units, we may represent this as a 100×1 rectangle for each target, and then the consequent shift of the first target type is by 15 units to the left. One of ordinary skill in the art would understand that other target correlations and first and second target type sizes will determine the amount to shift the first target type in the first direction. It is important to understand that because the target types are being represented as generalized shapes, which are in this method represented by Venn rectangles, that the actual shape of the targets is not important with respect to the method of ATR prediction; the target information that is captured is the shape similarity (represented by the correction matrix) and the sizes of the targets, and thus the ATR performance of any set of targets can be modeled by this method without precise knowledge of the targets' actual precise shape. Thus the method discussed in this paragraph only needs to deal with the shifting and overlap of the Venn rectangles.

At block 218, project target type 1 and target type 2 onto a common plane after the shift by Tc.

At blocks 220, 222 and 224, the first, second and third partitions are outputted to block 226. The first partition is defined as the overlapping portion between the first target type and the second target type. For example, the first partition is equivalent to the target correlation, since it is based on geometric similarity between the first and second target types. Accordingly, if the target correlation is 85% and the Ts (Target Size) is 100 units, the first partition is 100×85%=85 units. For example, if the SAR resolution is known, the 100 units may be converted into resolution elements.

At block 226, the partitions from Target Combinations 1 through "x" are compiled into a set. For example, the target and background partitions from target combinations 1 and 2 are compiled into a set, each target with four partitions (Rayleigh Background Clutter, Rayleigh Background Shadow, Target Diffuse Rayleigh and Target Specular Rician, giving 12 partitions (assuming 4 partitions are non-discriminatory out of 4×4 total subsets because the density functions are identical under hypotheses of targets 1 and 2 for exactly 4 sets obtained from the outer product of the 4×4 partitions). The partitions may be assigned target probability density and background probability density functions with target and background probability density components (e.g., diffusion, specular, clutter and shadow components of target and background relative RCS). The target and background probability density functions with Rayleigh and Rician components, for example, may be used to calculate the conditional log likelihood using Monte-Carlo integration, as discussed above with respect to blocks 108-112.

FIG. 3 is a diagram illustrating the partitioning of observation space for a two-class combination of target types based on target correlation in accordance with an embodiment of the present invention.

Referring to FIG. 3, (a) illustrates the first target type (T1) 302 being shifted right in accordance with the target correlation with respect to the location of the second target type (T2) 304 (e.g., associated with the specific two-class combination of target types (T1 302, T2 304)). As described above with respect to FIGS. 1 and 2, T1 is shifted by 1−Tc in a first direction, where Tc is the target correlation, with respect to the location of T2 304. For example, if the target correlation is 90%, T1 302 is shifted by 10 units to the right, assuming that Ts (Target Size) of T1 302 is 100 units. The second partition (P2) 306 is shown to be the non-overlapping portion not covered by T1 302 after T1 302 is shifted to the right. Accordingly, P2 306 is 10 units, assuming that Ts of T1 302 is 100 units.

Referring still to FIG. 3, (b) illustrates T1 302 being shifted left in accordance with the target correlation with respect to the location of T2 304 (e.g., associated with the specific two-class combination of target types (T1 302, T2 304)). As described above with respect to FIGS. 1 and 2, T1 302 is shifted by 1−Tc in a second direction, where Tc is the target correlation. For example, if the target correlation is 90%, T1 302 is shifted by 10 units to the left, assuming that Ts (Target Size) of T1 302 is 100 units. The third partition (P3) 308 is shown to be the non-overlapping portion not covered by T1 302 after T1 302 is shifted to the left. Accordingly, P3 308 is 10 units, assuming that Ts of T1 302 is 100 units.

Referring still to FIG. 3, the total observation space for the two-class combination of target types is determined by summing the target partition, the first background partition, and the second background partition. The target partition is Ts of T1 302×Tc, which is 100 units×90%, which equals 90 units. The size of P2 306 is 10 units, and the size of P3 is 10 units. Accordingly, the observation space is equal to 110 units. The number of resolution elements in the observation space is calculated by dividing the number of units of the observation space by the SAR resolution. For example, if the total observation space is 110 feet$^2$ and the known SAR resolution is 1 foot, the total observation space would be 110 resolution elements. One of ordinary skill in the art would understand that the SAR resolution and the units of measurement are merely an example, and would depend on the system parameters and designers' requirements.

FIG. 4 is a block diagram of a system for synthetic aperture radar automatic target recognition performance model in accordance with an embodiment of the present invention.

Referring to FIG. 4, the system 400 includes a target correlation matrix generator 402, a probability density generator 404, a training set quantization input 406, a pose search quantization input 408, a sensor resolution input 410, a partition generator 412, a random number generator 414 and an ATR calculator 416.

In the embodiment according to FIG. 4, the target correlation matrix 402 is configured to generate a target correlation matrix for each possible two-class combination of target types among a set of possible target types. Each of the target correlation matrix elements is associated with a target correlation and a generalized SAR observation space.

In the embodiment according to FIG. 4, the probability density generator 404 includes a target relative radar cross-section signature (RCS) generator 418, a Rayleigh diffuse component generator 420, a Rician specular component generator 422, a target mixture density generator 424, a background relative RCS generator 426, a Rayleigh clutter component generator 428, a Rayleigh shadow component generator 430 and a background mixture density generator 432. The probability density generator is for generating a target probability density of a target RCS and a background probability density of a background RCS.

The target relative RCS generator 418, for example, is configured to generate a target relative RCS from a SAR image. In an embodiment, the SAR image is a generic SAR image. The Rayleigh diffuse component generator 420, for example, is configured to generate a Rayleigh diffuse component from the target relative RCS. The Rician specular component generator 422, for example, is configured to generate a Rician specular component from the target relative RCS. The target mixture density generator 424, for example, is configured to combine the Rayleigh diffusion component and the Rician specular component to generate a target mixture density (e.g., a target probability density). The background relative RCS generator 426, for example, is configured to generate a background relative RCS from a SAR image. For example, the SAR image is a generic SAR image. The Rayleigh clutter component generator 428, for example, is configured to generate a Rayleigh clutter component from the background relative RCS. The Rayleigh shadow component generator 430, for example, is configured to generate a Rayleigh shadow component from the background relative RCS. The background mixture density generator 432, for example, is configured to combine the Rayleigh clutter component and the Rayleigh shadow component to generate a background mixture density (e.g., a background probability density). One of ordinary skill in the art would understand that the various components described above associated with the probability density generator 404 may be implemented in various configurations depending on the system preferences and designers. For example, each of the generators 402, 404, 412, 414 and ATR calculator 416 may be implemented via one or more ASICs, FPGAs, programmed processors and/or the like, configured to perform the specified functions. For example, the processors may be coupled to a memory storing computer instructions which, when executed by the processor, allow the specified functions to occur. The system may also include one or more input and output devices (e.g. keyboard, keypad, display monitor, etc.). For example, data such as sensor resolution data may be input via an input device. Performance predictions may be output to, for example, a user, via an output device for analysis. The output predictions may also be stored in a memory, displayed on a monitor, and/or printed.

In the embodiment according to FIG. 4, the training set quantization input 406 is used by the partition generator 412 to factor in a number of training set templates. For example, the number of training set templates varies by degree, and the templates are used for angular quantization. The templates are used to factor in loss factors into the partitioning of the observation space.

In the embodiment according to FIG. 4, the pose search quantization input 408 is used by the partition generator 412 to factor in loss factors due to the accuracy of the pose search process in ATRs. Losses are represented in terms of reduction in the effective number of resolved pixels on target.

In the embodiment according to FIG. 4, the sensor resolution input 410 is used to define a size of each resolution element of the partitions. For example, if the total observation space is 110 feet$^2$ and the known SAR resolution is 1 foot, the total observation space would be 110 resolution elements. One of ordinary skill in the art would understand that the SAR resolution and the units of measurement are merely an example, and would depend on the system parameters and designers' requirements.

In the embodiment according to FIG. 4, the partition generator 412 partitions the observation space into a target partition and at least one background partition. The partitions are generated in accordance with the target correlation. In other words, the SAR observation space is generalized. For example, the observation space is partitioned into three partitions: one target partition and two background partitions (e.g., a first background partition and a second background partition). In an embodiment, the observation space is the union of the target partition and the first and second background partitions. The target partition may be defined to be the overlapping portion of a geometric representation of the first target type and a geometric representation of the second target type. The first background partition may be defined to be the non-overlapping portion between the first target type and the second target type after shifting the first target type in a first direction for a distance equal to 1−Tc, where Tc is the target correlation. The second background partition may be defined to be the non-overlapping portion between the first target type and the second target type after shifting the first target type in a second direction opposite the first direction for a distance equal to 1−Tc, where Tc is the target correlation. If the target correlation is 90%, therefore, the total observation space would be calculated to be 110% of the size of the original target types, assuming the target types are equal in size. One of ordinary skill in the art would understand that the observation space may also be calculated where the target types are unequal sizes.

The partitioning of the observation space may further be described in terms of resolution elements. For example, a resolution element is derived from the effective sensor resolution of the SAR system. To determine the number of resolution elements of the observation space, the union of the target partition and the first and second background partitions is divided by the effective SAR sensor resolution (e.g., the quotient).

In the embodiment according to FIG. 4, the random number generator 414 is configured to generate at least one random number for each partition. For example, the partitions have been assigned with either a target probability density or a background probability density. In an embodiment, the target partition is assigned with the target probability density, and the first and second background partitions are assigned with the background probability density. Accordingly, the at least one random number functions as a SAR "observation" (e.g., randomized input). For example, the at least one random number is generated using Monte-Carlo simulation. Since it is extremely difficult to analytically calculate the integral for the total observation space, Monte-Carlo integration numerically calculates instances of the conditional log likelihoods for each partition for each two-class combination of target type, given that one target type is true. In an embodiment, a random number is calculated for each of the resolution elements in the partitions (e.g., each pixel). For example, each draw of the Monte-Carlo simulation is equivalent to an amount of information one would obtain in a SAR image (per pixel). In other words, the Monte-Carlo simulation calculates randomized observations from the target and background probability densities, given Rayleigh and Rician probability density parameters, that are approximately equivalent in terms of the amount of information that one would obtain from actual SAR measurements of the true target.

In the embodiment according to FIG. 4, the ATR generator 416 is configured to calculate a conditional log likelihood using the at least one random number for each of the partitions in accordance with the target probability density and the background probability density. The ATR generator 416 is also configured to sum the conditional log likelihoods of the partitions according to each of the two-class combinations of target types and calculate a maximum log likelihood from the summed conditional log likelihoods given that one target type of the two-class combinations of target types is assumed to be true. For example, the result is a sum of the respective two-class combinations of target types over all partitions, which gives the conditional log likelihood of each of the two-class combinations of target types. The ATR generator 416 further is configured to generate an automatic target recognition performance prediction based on the maximum log likelihood. For example, in other words, the sum of the respective two-class combinations of target type conditional log likelihoods over all partitions gives a conditional log likelihood of each two-class combination of target types which may be tested for "correct" or "incorrect" for the maximum log likelihood, allowing estimation of the overall probability of identification (P(ID)) using Monte-Carlo simulations. In an embodiment, the conditional log likelihood is calculated by resolution element. In another embodiment, the random numbers are compiled and the conditional log likelihood is calculated by partition.

As described above, the ATR generator 416 generates an ATR performance prediction based on the maximum log likelihood. For example, the ATR performance prediction is P(ID), which is expressed as the ratio of the number of target types identified correctly and the number of target types detected (e.g., $P(ID)=N_{ID}/N_{DET}$). Using the results of the maximum log likelihood, P(ID) takes into account the average over all targets. The P(ID) ratio provides a result that may allow one of ordinary skill in the art to understand how often a given SAR ATR will work correctly (e.g., 95% of the time). The result attempts to predict the theoretical maximum performance of the particular SAR ATR.

In an embodiment, the target probability density includes both a Rayleigh diffuse component and a Rician specular component, and the background probability density includes Rayleigh clutter and shadow components.

Therefore, there is presented a performance model for SAR ATR that provides engineering-level performance predictions over a variety of operating conditions, target types, sensor design parameters and other known parameters. The performance model provides ATR predictions of target type using a high-level knowledge of the SAR system, using mixture densities within correlation-based generalized sets and for Monte-Carlo integration.

The performance model assumes that a variety of known parameters affect SAR ATR performance, and models these such that it is not necessary to actually perform the SAR ATRs to measure theoretical maximum performance.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A computer-implemented method for predicting automatic target recognition performance, the method comprising:

generating a target correlation matrix each having a target correlation and a synthetic aperture radar observation space for multiple two-class combinations of target types;

generating a target probability density of a target radar cross-section signature and a background probability density of a background radar cross-section signature;

partitioning the observation space of each of the two-class combinations of target types into a target partition and at least one background partition in accordance with the target correlation;

calculating a conditional log likelihood for each of the partitions using at least one random number in accordance with the target probability density and the background probability density;

summing the conditional log likelihoods of the partitions according to each of the two-class combinations of target types associated with the correlation matrix and observation space;

calculating a maximum log likelihood from the summed conditional log likelihoods given that one target type of the multiple two-class combinations of target types is assumed to be true;

generating an automatic target recognition performance prediction based on the maximum log likelihood; and outputting the performance prediction via an output device.

2. The method of claim 1, further comprising:
assigning the target probability density to the target partition and the background probability density to the at least one background partition.

3. The method of claim 1, wherein the target correlation matrix is based on a geometric similarity between a first target type of one of the two-class combinations of target types and a second target type of the one of the two-class combinations of target types.

4. The method of claim 1, wherein the observation space is partitioned by projecting a geometric representation of a first target type of one of the two-class combinations of target types over a geometric representation of a second target type of the one of the two-class combinations of target types, shifting the first target type in a first direction in accordance with the target correlation and shifting the first target type in a second direction opposite the first direction in accordance with the target correlation.

5. The method of claim 4, wherein the target partition comprises an overlapping portion between the first target type and the second target type, a first background partition comprises a first non-overlapping portion between the first target type and the second target type after the first target type is shifted in the first direction, and a second background partition comprises a second non-overlapping portion between the first target type and the second target type after the first target type is shifted in the second direction.

6. The method of claim 5, wherein the observation space is a union of the target partition, the first background partition and the second background partition.

7. The method of claim 6, wherein the partitions comprise resolution elements having a size determined by a quotient of the observation space and a synthetic aperture radar resolution.

8. The method of claim 7, wherein the at least one random number is generated for each of the resolution elements.

9. The method of claim 1, wherein the simulated target radar cross-section signature and the simulated background radar cross-section signatures are generated from a probabilistic model of the radar cross-section measurement and the radar background cross-section measurement, respectively.

10. The method of claim 1, wherein the target probability density is modeled by diffuse and specular components of the target radar cross-section signature.

11. The method of claim 10, wherein the diffuse component comprises Rayleigh parameters and the specular component comprises Rician parameters.

12. The method of claim 1, wherein the background probability density is generated from clutter and shadow components of the background radar cross-section signature.

13. The method of claim 12, wherein the clutter and shadow components comprise Rayleigh parameters.

14. The method of claim 1, wherein the target partition and the at least one background partition for each of the two-class combinations of target types are compiled into a set.

15. The method of claim 14, wherein the at least one random number is generated by Monte-Carlo simulation for each of the members of the set.

16. The method of claim 1, wherein the observation space is partitioned, for each pairwise combination of types of the correlation matrix, in accordance with the vector outer product of the partitions in each generalized representation of the union of targets and background, for each combination of target types.

17. A system for predicting automatic target recognition performance, comprising:
a target correlation matrix generator configured to generate a target correlation matrix for multiple two-class combinations of target types each having a target correlation and a synthetic aperture radar observation space;
a probability density generator for generating a target probability density of a target radar cross-section signature and a background probability density of a background radar cross-section signature;
a partition generator for partitioning the observation space of each of the two-class combinations of target types into a target partition and at least one background partition in accordance with the target correlation;
a random number generator for generating at least one random number for each of the partitions in accordance with the target probability density and the background probability density, wherein the target partition is associated with the target probability density and at least one background partition is associated with the background probability density;
an automatic target recognition performance calculator for calculating a conditional log likelihood using the at least one random number for each of the partitions in accordance with the target probability density and the background probability density, summing the conditional log likelihoods of the partitions according to the two-class combinations of target types, calculating a maximum log likelihood from the summed conditional log likelihoods given that one target type of the two-class combinations of target types is assumed to be true, and generating an automatic target recognition performance prediction based on the maximum log likelihood; and
an output device for outputting the performance prediction.

18. A system for predicting automatic target recognition performance, the system comprising:
an output device;
a processor coupled to the output device; and
a memory coupled to the processor and storing computer instructions therein, the processor being operable to execute the program instructions, the program instructions including:
generating a target correlation matrix each having a target correlation and a synthetic aperture radar observation space for multiple two-class combinations of target types;
generating a target probability density of a target radar cross-section signature and a background probability density of a background radar cross-section signature;
partitioning the observation space of each of the two-class combinations of target types into a target partition and at least one background partition in accordance with the target correlation;
calculating a conditional log likelihood for each of the partitions using at least one random number in accordance with the target probability density and the background probability density;
summing the conditional log likelihoods of the partitions according to the two-class combinations of target types;
calculating a maximum log likelihood from the summed conditional log likelihoods given that one target type of the multiple two-class combinations of target types is assumed to be true;
generating an automatic target recognition performance prediction based on the maximum log likelihood; and
outputting the performance prediction via the output device.

* * * * *